United States Patent
Burden et al.

(10) Patent No.: US 7,888,407 B2
(45) Date of Patent: Feb. 15, 2011

(54) DISPERSE NON-POLYALPHAOLEFIN DRAG REDUCING POLYMERS

(75) Inventors: Timothy L. Burden, Ponca City, OK (US); Ray L. Johnston, Ponca City, OK (US); William F. Harris, Ponca City, OK (US); Kenneth W. Smith, Tonkawa, OK (US); Wayne R. Dreher, Ponca City, OK (US); Stuart N. Milligan, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 537 days.

(21) Appl. No.: 11/925,214

(22) Filed: Oct. 26, 2007

(65) Prior Publication Data

US 2009/0111714 A1 Apr. 30, 2009

(51) Int. Cl.
*C09K 3/00* (2006.01)
(52) U.S. Cl. ..................................... 523/175
(58) Field of Classification Search ................... 523/175
See application file for complete search history.

(56) References Cited

U.S. PATENT DOCUMENTS

| | | | |
|---|---|---|---|
| 3,493,000 A | 2/1970 | Canevari et al. | |
| 3,654,994 A | 4/1972 | Slagel et al. | |
| 3,661,541 A | 5/1972 | Hollyday, Jr. | |
| 3,679,582 A | 7/1972 | Wagenaar et al. | |
| 3,726,653 A | 4/1973 | van der Meij et al. | |
| 3,748,266 A | 7/1973 | Malone et al. | |
| 3,758,406 A | 9/1973 | Malone et al. | |
| 3,857,402 A | 12/1974 | Schuh | |
| 3,985,703 A | 10/1976 | Ferry et al. | |
| 4,190,069 A | 2/1980 | Krantz | |
| 4,212,312 A | 7/1980 | Titus | |
| 4,340,076 A | 7/1982 | Weitzen | |
| 4,358,572 A | 11/1982 | Mack et al. | |
| 4,546,784 A | 10/1985 | Schulz et al. | |
| 4,573,488 A | 3/1986 | Carville et al. | |
| 4,656,204 A | 4/1987 | Duvdevani et al. | |
| 4,693,321 A | 9/1987 | Royer | |
| 4,881,566 A | 11/1989 | Ubels et al. | |
| 4,983,186 A | 1/1991 | Naiman et al. | |
| 5,080,121 A | 1/1992 | Malik et al. | |
| 5,244,937 A | 9/1993 | Lee et al. | |
| 5,504,131 A | 4/1996 | Smith et al. | |
| 5,504,132 A | 4/1996 | Smith et al. | |
| 5,536,786 A | 7/1996 | Callahan, Jr. et al. | |
| 5,928,830 A | 7/1999 | Cheng et al. | |
| 6,015,779 A | 1/2000 | Eaton et al. | |
| 6,126,872 A | 10/2000 | Kommareddi et al. | |
| 6,160,036 A | 12/2000 | Kommareddi et al. | |
| 6,172,151 B1 | 1/2001 | Johnston et al. | |
| 6,178,980 B1 | 1/2001 | Storm | |
| 6,218,490 B1 | 4/2001 | Brunelli et al. | |
| 6,399,676 B1 | 6/2002 | Labude et al. | |
| 6,576,732 B1 | 6/2003 | Milligan et al. | |
| 6,720,384 B1 | 4/2004 | Mayer et al. | |
| 6,723,683 B2 | 4/2004 | Crossman et al. | |
| 6,723,779 B2 | 4/2004 | Drujon et al. | |
| 6,765,053 B2 | 7/2004 | Labude et al. | |
| 6,838,418 B2 | 1/2005 | Allan et al. | |
| 6,841,593 B2 | 1/2005 | Kommareddi et al. | |
| 6,841,608 B1 | 1/2005 | Dreher et al. | |
| 6,851,444 B1 | 2/2005 | Kohl et al. | |
| 6,894,088 B2 | 5/2005 | Motier et al. | |
| 6,946,500 B2 | 9/2005 | Harris et al. | |
| 7,119,132 B2 | 10/2006 | Harris et al. | |
| 2002/0065352 A1 | 5/2002 | Johnston et al. | |
| 2004/0060703 A1 | 4/2004 | Stegemeier et al. | |
| 2005/0049327 A1 | 3/2005 | Jovancicevic et al. | |
| 2005/0209368 A1 | 9/2005 | Yang et al. | |
| 2006/0144595 A1 | 7/2006 | Milligan et al. | |
| 2006/0148928 A1* | 7/2006 | Harris et al. | 523/175 |
| 2006/0293196 A1 | 12/2006 | Harris et al. | |

FOREIGN PATENT DOCUMENTS

| | | |
|---|---|---|
| EP | 0882739 | 9/1998 |
| GB | 1437132 | 5/1973 |
| WO | WO 9957162 | 11/1999 |
| WO | WO99/65958 | 12/1999 |
| WO | WO2008/079642 | 3/2008 |

OTHER PUBLICATIONS

U.S. Patent Application entitled Low-Viscosity Drag Reducer; U.S. Appl. No. 10/411,045, filed Apr. 9, 2003.
Ralph Little, Suzanne Smidt, Paul Huang, James Romans, Joseph Dedrick, and Jan S. Matuszko; Improved Drag Reduction by Control of Polymer Particle Size; American Chemical Society; Ind. Eng. Chem. Res. 1991, 30, 403-407; Washington, D.C.

* cited by examiner

*Primary Examiner*—Edward J Cain

(57) ABSTRACT

A drag reducing composition comprising at least one non-polyalphaolefin polymer having an average particle size in the range of from about 5 to about 800 micrometers. The non-polyalphaolefin polymer can initially be formed via emulsion polymerization. The initial polymer particles can then be at least partially consolidated and then reduced in size and suspended in a carrier fluid. The resulting drag reducing composition can be added to a hydrocarbon-containing fluid to decrease the pressure drop associated with the turbulent flow of the hydrocarbon-containing fluid through a conduit.

25 Claims, No Drawings

DISPERSE NON-POLYALPHAOLEFIN DRAG REDUCING POLYMERS

BACKGROUND OF THE INVENTION

1. Field of the Invention

The present invention relates generally to drag reducing compositions comprising disperse polymer particles. In another aspect, the present invention relates to drag reducing compositions comprising at least one drag reducing polymer made by emulsion polymerization.

2. Description of the Prior Art

When fluids are transported by a pipeline, a drop in fluid pressure typically occurs due to friction between the wall of the pipeline and the fluid. Due to this pressure drop, for a given pipeline, fluid must be transported with sufficient pressure to achieve a desired throughput. When higher flow rates are desired through the pipeline, more pressure must be applied due to the fact that as flow rates are increased the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. It has been found that effective drag reduction can be achieved by employing drag reducing polymers having molecular weights in excess of five million. However, despite these advances in the field of drag reducing polymers, a need still exists for improved drag reducers.

SUMMARY OF THE INVENTION

In one embodiment of the present invention, there is provided a process for preparing a drag reducer. The process of this embodiment comprises: (a) consolidating a plurality of initial particles comprising at least one polymer prepared via emulsion polymerization to thereby form one or more consolidated polymer structures; (b) decreasing the size of at least a portion of the consolidated polymer structures to thereby form a plurality of modified polymer particles; and (c) dispersing at least a portion of the modified polymer particles in a carrier fluid to thereby form the drag reducer.

In another embodiment of the present invention, there is provided a drag reducer comprising a plurality of particles comprising a non-polyalphaolefin polymer. The particles are dispersed in a carrier fluid and have an average particle size in the range of from about 5 to about 800 micrometers. The polymer has a weight average molecular weight of at least about $1\times10^6$ g/mol.

In yet another embodiment of the present invention, there is provided a method for reducing drag in a pipeline. The method of this embodiment comprises: (a) introducing a drag reducer into a hydrocarbon-containing fluid to thereby form a treated hydrocarbon-containing fluid; and (b) flowing the treated hydrocarbon-containing fluid through a pipeline. The drag reducer comprises a disperse phase comprising a plurality of particles comprising a non-polyalphaolefin polymer. The particles have an average particle size in the range of from about 5 to about 800 micrometers. The polymer has a weight average molecular weight of at least about $1\times10^6$ g/mol.

DETAILED DESCRIPTION

In accordance with one embodiment of the present invention, a drag reducing composition (i.e., a drag reducer) is provided comprising a carrier fluid and a plurality of particles comprising a non-polyalphaolefin polymer. The non-polyalphaolefin polymer particles of the present invention can be prepared by first forming polymer particles via emulsion polymerization, followed by consolidating at least a portion of these initial particles into one or more consolidated polymer structures. Next, the size of the resulting consolidated polymer structures can be decreased, and the resulting modified polymer particles can be dispersed in the carrier fluid. The drag reducer of the present invention can be employed to at least partially reduce the pressure drop associated with the turbulent flow of a hydrocarbon-containing fluid through a conduit (e.g., a pipeline).

As mentioned above, the first step in producing the non-polyalphaolefin polymer particles of the present invention can be performed by preparing a non-polyalphaolefin polymer via emulsion polymerization. This step can comprise the emulsion polymerization of a reaction mixture comprising one or more monomers, a continuous phase, at least one surfactant, and an initiation system. As used herein, the term "emulsion polymer" shall denote any polymer prepared via emulsion polymerization.

As discussed in greater detail below, the resulting reaction product of the emulsion polymerization can be in the form of a latex composition comprising a disperse phase of non-polyalphaolefin particles (a.k.a., initial particles). The continuous phase of the latex composition generally comprises at least one component selected from the group consisting of water, polar organic liquids (e.g., alcohol), and mixtures thereof. When water is the selected constituent of the continuous phase, the reaction mixture can also comprise a buffer. Additionally, as described in more detail below, the continuous phase can optionally comprise a hydrate inhibitor.

In one embodiment of the present invention, the non-polyalphaolefin polymer prepared via emulsion polymerization can comprise a plurality of repeating units of the residues of one or more of the monomers selected from the group consisting of:

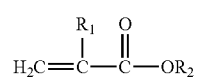

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—R$_4$ or —(CH2CH(CH3)O)$_x$—R$_4$ radical wherein x is in the range of from 1 to 50 and R$_4$ is H, a C1-C30 alkyl radical, or a C6-C30 alkylaryl radical;

R₃-arene-R₄  (B)

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein $R_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein $R_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

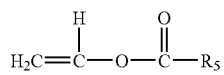  (C)

wherein $R_5$ is H, a C1-C30 alkyl radical, or a C6-C20 substituted or unsubstituted aryl radical;

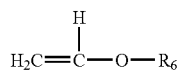  (D)

wherein $R_6$ is H, a C1-C30 alkyl radical, or a C6-C20 substituted or unsubstituted aryl radical;

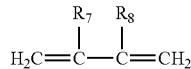  (E)

wherein $R_7$ is H or a C1-C18 alkyl radical, and $R_8$ is H, a C1-C18 alkyl radical, or Cl;

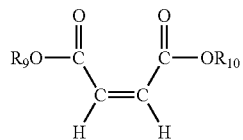  (F)

wherein $R_9$ and $R_{10}$ are independently H, a C1-C30 alkyl radical, a C6-C20 substituted or unsubstituted aryl radical, a C5-C30 substituted or unsubstituted cycloalkyl radical, or heterocyclic radicals;

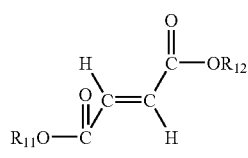  (G)

wherein $R_{11}$ and $R_{12}$ are independently H, a C1-C30 alkyl radical, a C6-C20 substituted or unsubstituted aryl radical, a C5-C30 substituted or unsubstituted cycloalkyl radical, or heterocyclic radicals;

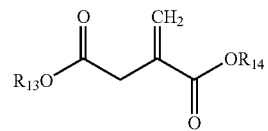  (H)

wherein $R_{13}$ and $R_{14}$ are independently H, a C1-C30 alkyl radical, a C6-C20 substituted or unsubstituted aryl radical, a C5-C30 substituted or unsubstituted cycloalkyl radical, or heterocyclic radicals;

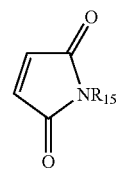  (I)

wherein $R_{15}$ is H, a C1-C30 alkyl radical, a C6-C20 substituted or unsubstituted aryl radical, a C5-C30 substituted or unsubstituted cycloalkyl radical, or heterocyclic radicals;

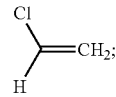  (J)

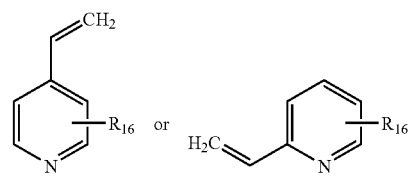  (K)

wherein $R_{16}$ is H, a C1-C30 alkyl radical, or a C6-C20 aryl radical;

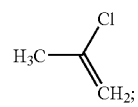  (L)

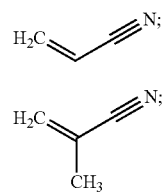  (M)

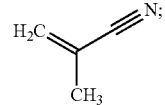  (N)

(O)

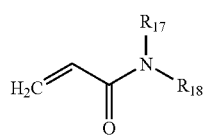

(P)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and

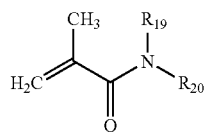

(Q)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

As mentioned above, the emulsion polymer of the present invention can comprise a non-polyalphaolefin polymer. Additionally, the emulsion polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the emulsion polymer can be a copolymer comprising repeating units of the residues of 2-ethylhexyl methacrylate and the residues of at least one other monomer. In yet another embodiment, the emulsion polymer can be a copolymer comprising repeating units of the residues of 2-ethylhexyl methacrylate monomers and butyl acrylate monomers. In still another embodiment, the emulsion polymer can be a homopolymer comprising repeating units of the residues of 2-ethylhexyl methacrylate.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinate (available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly(ethyleneoxy)ethanols (available as the IGEPAL CA and CO series, respectively from Rhodia, Cranbury, N.J.), C8 to C18 ethoxylated primary alcohols (such as RHODASURF, LA-9 from Rhodia Inc., Cranbury, N.J.), C11 to C15 secondary-alcohol ethoxylates (available as the TERGITOL 15-S series, including 15-S-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment of the present invention, the emulsion polymer of the disperse phase of the latex can have a weight average molecular weight ("$M_w$") of at least about $1\times10^6$ g/mol, at least about $2\times10^6$ g/mol, or at least $5\times10^6$ g/mol. The initial emulsion polymer particles can have a mean particle size of less than about 1 micrometer ("μm"), in the range of from about 10 to about 500 nanometers ("nm"), or in the range of from 50 to 250 nm. At least about 95 percent by weight of the initial emulsion polymer particles in the latex can be larger than about 10 nm and smaller than about 500 nm. Further, at least about 95 percent by weight of the particles can be larger than about 25 nm and smaller than about 250 nm.

As previously noted, after the emulsion polymer has been prepared, at least a portion of the initial polymer particles in the latex can be consolidated in order to form one or more consolidated polymer structures. As used herein, the term "consolidated polymer structure" shall denote polymer particles or structure having an increased average particle size

| Ingredient | Broad Range | Narrow Range |
|---|---|---|
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiator (molar ratio) | $1 \times 10^3$:1-$5 \times 10^6$:1 | $5 \times 10^3$:1-$2 \times 10^6$:1 |
| Monomer:Reducing Comp. (molar ratio) | $1 \times 10^3$:1-$5 \times 10^6$:1 | $1 \times 10^4$:1-$2 \times 10^6$:1 |
| Accelerator:Initiator (molar ratio) | 0.001:1-10:1 | 0.005:1-1:1 |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction yields a latex composition comprising a disperse phase of solid particles and a liquid continuous phase at room temperature. The latex can be a stable colloidal dispersion comprising a disperse phase of high molecular weight polymer particles and a continuous phase comprising water. The polymer particles can make up in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can make up in the range of from about 0.1 to about 10 percent by weight of the latex, or in the range compared to the average particle size of the polymer particles prior to consolidation. Consolidation of the initial latex particles can be accomplished by any method known in the art capable of producing consolidated polymer structures. In one embodiment of the present invention, consolidation can be performed using any technique sufficient to produce consolidated polymer structures having an average particle size at least about 5 times, at least about 10 times, or at least 100 times the average particle size of the initial particles prior to consolidation.

In one embodiment of the present invention, consolidation of the initial emulsion polymer particles can be accomplished by subjecting the latex to a drying step. Consolidation by drying can be accomplished by any drying method known in the art capable of removing of at least a portion of the continuous phase of the latex described above. In one embodiment, the drying technique employed can be sufficient to remove at least about 70 weight percent, at least about 90 weight percent, or at least 95 weight percent of the continuous phase of the latex.

In one embodiment, the drying technique employed to form the above-mentioned consolidated polymer structures can be spray drying. Spray drying is a method of drying materials having both liquid and solid phases, including such materials as latexes, colloids, and suspensions. Any spray drying method known in the art can be employed as the consolidation technique in the present invention. Additionally, the spray drying technique employed in the present invention can comprise at least two steps: (1) atomization and (2) gas/droplet mixing.

Any atomization technique known in the industry can be employed in the present invention that is capable of atomizing the latex formed via emulsion polymerization discussed above. In one embodiment, the latex can be atomized employing an atomizer. The latex droplets formed by the atomizer can have an average diameter in the range of from about 1 to about 500 µm, in the range of from about 25 to about 350 µm, or in the range of from 50 to 200 µm. The atomizer employed in the present invention can be any atomizer known in the art. Examples of suitable atomizers include, but are not limited to, high-pressure nozzles, two-fluid nozzles, and high-speed centrifugal disks.

Once the latex has been atomized, the resulting droplets can then be contacted with a gas stream to at least partially vaporize the continuous phase of the latex. The gas stream suitable for use in the present invention can be air and/or all inert gas. The temperature of the gas stream can be any temperature sufficient to vaporize at least a portion of the continuous phase of the latex. Additionally, the flow of the gas stream can be counter-current or co-current with the flow of the atomized latex. The droplet/gas mixing time can be any length of time sufficient to produce consolidated polymer structures having increased particle sizes as discussed above. Additionally, the droplet/gas mixing can be sufficient to remove at least about 70 weight percent, at least about 90 weight percent, or at least 95 weight percent of the continuous phase of the latex.

In one embodiment, a partitioning agent can be added to the latex prior to and/or during spray drying to control the amount of agglomeration of the polymer. Any partitioning agent known in the industry for limiting polymer agglomeration can be employed in the present invention. Examples of suitable partitioning agents include, but are not limited to, alumina, silica, calcined clay, talc, carbon black, calcium stearate, and/or magnesium stearate. The amount of partitioning agent employed in the spray drying process can be varied depending on the extent of agglomeration desired. In one embodiment, the partitioning agent can be present in an amount in the range of from about 0.1 to about 40 weight percent, in the range of from about 1 to about 30 weight percent, or in the range of from 2 to 25 weight percent based on the combined weight of the latex and partitioning agent.

In another embodiment of the present invention, the drying technique employed to form the above-mentioned consolidated polymer structures can be thin-layer drying. The thin-layer drying technique suitable for use in the present invention can be any method known in the art that evaporates at least a portion of the continuous phase of the latex, leaving behind a thin layer of film comprising one or more of the above-mentioned consolidated polymer structures.

In one embodiment, thin-layer drying of the latex can be achieved by placing the latex into a mold, which can be in the shape of a tray or pan. The latex can then be spread into a thin layer. Any method known in the art capable of creating the desired thickness can be employed for spreading the latex in the mold. For example, the latex can be spread in the mold by various mechanical processes to create the desired thickness. Once spread, the latex can have a thickness of less than about 1 inch, less than about 0.75 inches, or less than 0.5 inches. In one embodiment, the pan or tray employed in the present invention can be a moving conveyor-type surface in order to make the drying process continuous.

Evaporation of at least a portion of the continuous phase of the latex can be achieved by any method known in the art of thin-layer drying. For example, evaporation can be promoted by forced convection in which dry gas, such as air or nitrogen, is blown over the surface of the latex. As another example, evaporation can be achieved by employing a spin coating technique. Spin coating is a process whereby the latex is placed on a substrate and then spun at a high speed. Centripetal acceleration causes the latex to spread leaving behind the above-mentioned thin layer of film. Additionally, the latex can be heated to promote evaporation of the continuous phase. This can be done by heating the surface on which the thin film is being formed and/or by heating the gas that is being forced across it. Furthermore, the latex can be subjected to vacuum conditions to promote evaporation of the carrier fluid. Regardless of which method is employed, at least about 70 weight percent, at least about 90 weight percent, or at least 95 weight percent of the continuous phase can be evaporated during thin-layer drying.

The thickness of the resulting film can vary depending on which method or combination of methods is employed. Additionally, film thickness can be affected by viscosity of the continuous phase and percent solids of the latex, among others. In general, however, the thickness of the resulting one or more consolidated polymer structures (i.e., the "thin layer") formed via thin-layer drying can be in the range of from about 0.001 to about 0.25 inches, in the range of from about 0.005 to about 0.2 inches, or in the range of from 0.01 to 0.15 inches.

In another embodiment of the present invention, the drying technique employed to form the above-mentioned consolidated polymer structures can be freeze drying. The freeze drying technique suitable for use in the present invention can be any freeze drying process known in the art suitable to cause at least a portion of the continuous phase of the latex to sublimate, thereby creating one or more of the above-described consolidated polymer structures. For example, a freeze drying process suitable for use in the present invention can comprise the steps of freezing the latex followed by applying vacuum to the frozen latex.

After the one or more consolidated polymer structures has been formed via a drying step, such as those described above, the one or more consolidated polymer structures can be reduced in size. The size reduction process can comprise one or more course and/or fine size reduction steps, as will be discussed in greater detail below.

In another embodiment of the present invention, consolidation of the emulsion polymer from the latex can be accomplished by freezing the latex. Formation of the one or more consolidated polymer structures via freezing can be accomplished by reducing the temperature of the latex to below the freezing point of the continuous phase. Depending on the freeze/thaw stability of the latex, the freezing process may only need to be performed once, or it can be repeated until the desired one or more consolidated polymer structures are obtained. As used herein, the term "freeze/thaw stability" denotes the degree to which the polymer portion of a latex can resist coagulation or flocculation when frozen as determined by ASTM method D2243. Thus, a latex having a higher freeze/thaw stability can undergo multiple freeze/thaw cycles in order to obtain one or more consolidated polymer structures. In one embodiment, the latex of the present invention can have a freeze/thaw stability of less than 5 cycles, less than 3 cycles, or less than 1 cycle.

Freezing of the latex may be accomplished by any method known in the art for lowering the temperature of the latex to the desired degree. One exemplary method suitable for use in the present invention involves placing the latex into one or more polymeric enclosures, such as, for example, plastic bags or bottles. Suitable plastics for forming the enclosures include, but are not limited to, high-density polyethylene, nylon, polytetrafluoroethylene, polystyrene, and polyolefins. The enclosure can then be sealed to prevent loss of the latex and immersed in a coolant bath. The coolant employed in the coolant bath can be any coolant capable of lowering the temperature of the latex to below the freezing point of the continuous phase. A suitable coolant for use in the present invention includes, but is not limited to, liquid nitrogen.

Another exemplary method for freezing the latex of the present invention involves placing the latex into molds of a desired size and then lowering the temperature of the latex to the desired degree. Similarly, another method includes forming the latex into droplets, followed by freezing of the droplets. These methods can facilitate later size reduction of the one or more consolidated polymer structures, discussed below.

According to another embodiment of the present invention, consolidation of the emulsion polymer in the latex to form the above-mentioned one or more consolidated polymer structures can be accomplished by combining the latex with salt water. This method can be accomplished by adding the latex to salt water over a period of time. Conversely, the salt water can be added to the latex over a period of time. The combination of the latex and the salt water can be accomplished by any known method in the art. For example, the combination can be accomplished by pump, gravity feed, or any other suitable method. The latex/salt water mixture can be continuously stirred during addition.

The salt water suitable for use in the present invention can comprise any ionized compound in water. Though not wishing to be bound by theory, it is believed that ionized species cause agglomeration of the latex polymer by interfering with the electrical double layer that stabilizes the latex particles. Examples of ionizable compounds suitable for use in the present invention include, but are not limited to, alkali metal, alkaline earth metal, and/or transition metal salts of halides, nitrates, phosphates, sulfates, and/or other anions.

In one embodiment, the volume ratio of latex-to-salt water can be in the range of from about 1:2 to about 1:100, in the range of from about 1:5 to about 1:50, or in the range of from 1:10 to 1:25. Additionally, the concentration of salt in the salt water can be at least about 0.5 weight percent, or at least 5 weight percent. The temperature of the salt water and latex during mixing can be in the range of from about the freezing point of the latex to about 100° C.

Once the desired one or more consolidated polymer structures have formed, the consolidated polymer structures can be substantially isolated by any methods known in the art for accomplishing solid/liquid separation. The selected isolation technique can be sufficient to remove at least about 70, at least about 90, or at least 95 weight percent of the remaining continuous phase. For example, the consolidated polymer structures can be substantially isolated via decantation, filtration, screening and/or centrifugation. After the one or more consolidated polymer structures have been substantially isolated, they can undergo size reduction as discussed in further detail below.

According to another embodiment of the present invention, consolidation of the emulsion polymer in the latex to form the above-mentioned one or more consolidated polymer structures can be accomplished by combining the latex with a water-miscible solvent. This method can be accomplished by adding the latex to the water-miscible solvent over a period of time. Conversely, the water-miscible solvent can be added to the latex over a period of time. The combination of the latex and the water-miscible solvent can be accomplished by any known method in the art. For example, the combination can be accomplished by pump, gravity feed, or any other suitable method. The resulting mixture can be continuously stirred during addition.

The water-miscible solvent suitable for use in the present invention can comprise any water-miscible solvent that is a non-solvent for the polymer particles when mixed with water. In one embodiment, the water-miscible solvent can be a non-solvent for the polymer particles even when not mixed with water. Examples of water-miscible solvents suitable for use in the present invention include, but are not limited to, $C_1$ to $C_4$ alcohols, dimethyl formamide, dimethyl acetamide, tetrahydrofuran, sulfolane, nitromethane, furfural, and/or 1-methyl-2-pyrrolidinone.

In one embodiment, the volume ratio of latex-to-water-miscible solvent can be in the range of from about 1:2 to about 1:100, in the range of from about 1:5 to about 1:50, or in the range of from 1:10 to 1:25. The temperature of the water-miscible solvent and latex during mixing can be in the range of from about the freezing point of the latex to about the boiling point of the latex or the boiling point of the water-miscible solvent, whichever is lower.

Once the desired one or more consolidated polymer structures have formed, the consolidated polymer structures can be substantially isolated by any methods known in the art for accomplishing solid/liquid separation. The selected isolation technique can be sufficient to remove at least about 70 weight percent, at least about 90 weight percent, or at least 95 weight percent of the remaining continuous phase. For example, the consolidated polymer structures can be substantially isolated via decantation, filtration, screening, and/or centrifugation. After the one or more consolidated polymer structures have been substantially isolated, they can undergo size reduction as discussed in further detail below.

In another embodiment of the invention, consolidation of the emulsion polymer from the latex to form the above-mentioned one or more consolidated polymer structures can be accomplished by a dissolution/precipitation technique. In this embodiment, the polymer particles can be dissolved by combining the latex with a solvent for the polymer. After the polymer has been at least partially dissolved, the polymer can be precipitated to form the one or more consolidated polymer structures. In one embodiment, at least about 70 weight percent, at least about 90 weight percent, or at least 95 weight percent of the polymer can be dissolved in the solvent prior to precipitation. Any dissolution/precipitation techniques known in the art can be employed in the present invention.

In one embodiment, the solvent for use in the dissolution/precipitation technique can be a low-volatility solvent. Examples of low volatility solvents suitable for use in the present invention include, but are not limited to, tetrahydrofuran and/or toluene. The concentration of latex in the solvent can be less than about 20 weight percent, less than about 15 weight percent, or less than 10 weight percent based on the combined weight of the latex and solvent.

After the polymer has been at least partially dissolved, any method known in the art for precipitating a solute out of solution can be employed. Suitable precipitation techniques include, but are not limited to, contacting the solution with an alcohol or other non-solvent, or by flashing the solution to remove at least a portion of the volatile components of the solution. As used herein, the term "flashing" denotes a process whereby at least a portion of a solution is vaporized by sudden decrease in pressure and/or increase in temperature.

Once the desired one or more consolidated polymer structures have formed (i.e., precipitated), the consolidated polymer structures can be substantially isolated by any methods known in the art for accomplishing solid/liquid separation, provided any solvent and/or continuous phase remains after precipitation. The selected isolation technique can be sufficient to remove at least about 70 weight percent, at least about 90 weight percent, or at least 95 weight percent of the remaining continuous phase and/or solvent. For example, the consolidated polymer structures can be substantially isolated via decantation, filtration, screening, and/or centrifugation. After the one or more consolidated polymer structures have been substantially isolated, they can undergo size reduction as discussed in further detail below.

Regardless of which of the above-described methods is employed in forming the one or more consolidated polymer structures, in one embodiment of the present invention, the size of the one or more consolidated polymer structures can be decreased to thereby form modified polymer particles. Any method known in the art for reducing the particle size of a polymer-containing material can be employed in the present invention. In one embodiment, as described in greater detail below, the one or more consolidated polymer structures can undergo a multi-stage particle size reduction, including coarse size reduction followed by fine size reduction to form the modified polymer particles.

In some of the embodiments described above for forming the one or more consolidated polymer structures, the procedure employed may result in consolidated polymer structures having relatively large diameters (e.g., greater than 0.75 inches). Accordingly, the one or more consolidated polymer structures can optionally undergo coarse size reduction to form intermediate polymer particles. In one embodiment, the one or more consolidated polymer structures can undergo coarse size reduction sufficient to achieve intermediate polymer particles having an average size of less than about 2.5 inches on each side, less than about 1.5 inches on each side, or less than 0.75 inches on each side. Coarse size reduction of the one or more consolidated polymer structures can be achieved by any methods known in the art. Examples of methods suitable for use for coarse size reduction in the present invention include, but are not limited to, pulverizing via impact hammers, grinders and/or choppers. Additionally, the temperature of the one or more consolidated polymer structures can be maintained below the glass transition temperature of the polymer during coarse size reduction.

In one embodiment, at least a portion of the one or more consolidated polymer structures (or, optionally, at least a portion of the intermediate polymer particles) car, be reduced to a finely divided state (i.e., modified polymer particles). As used herein, the term "finely divided state" when used to describe a particulate material shall denote an average particle size of less than 2,000 μm. Any technique known in the art for reducing the particle size of a polymer can be employed in the present invention. In one embodiment, at least a portion of the one or more consolidated polymer structures can be subject to cryogrinding. As used herein, the term "cryogrinding" shall denote any process whereby a polymer is reduced to a finely divided state at cryogenic temperatures. As used herein, the term "cryogenic temperature" shall denote any temperature below the glass transition temperature of the polymer being ground.

The temperature of the one or more consolidated polymer structures (or, optionally, the intermediate polymer particles) can be lowered to cryogenic temperatures prior to being reduced to a finely divided state. In one embodiment, the reduction in temperature of the consolidated polymer structures can be obtained by contacting the consolidated polymer structures with liquid nitrogen. The resulting low-temperature consolidated polymer structures can then be introduced into a cold mill and ground to achieve the desired particle size.

Optionally, a partitioning agent can be added to the consolidated polymer structures during grinding to help prevent the freshly exposed surfaces of the polymer from sticking together. Examples of suitable partitioning agents useful in the present invention include, but are not limited to, alumina, silica, calcined clay, talc, carbon black, calcium stearate, and/or magnesium stearate. The amount of partitioning agent employed in the grinding process can be less than about 35 weight percent, less than about 30 weight percent, or less than 25 weight percent based on the total weight of the consolidated polymer structures and partitioning agent.

As discussed above, the one or more consolidated polymer structures can be formed via freezing. In one embodiment of the present invention, the consolidated polymer structures formed via this method can undergo size reduction while still frozen in the continuous phase. Furthermore, as mentioned above the latex can be frozen in a packaging material. This packaging material can optionally undergo size reduction concurrently with the consolidated polymer structures and frozen continuous phase.

The frozen latex, including the continuous phase and optionally the packaging materials can first be pulverized into intermediate polymer particles, as described above (e.g., chunks having an average size of less than 2.5 inches on each side). If the latex is freeze-thaw stable as defined above, coarse reduction can occur below the freezing point of the continuous phase of the latex. If the latex is not freeze-thaw stable, coarse reduction can occur at any reasonable temperature that does not impact product quality.

After coarse grinding, the intermediate polymer particles can be reduced to a finely divided state, employing methods such as those described above, in order to produce modified polymer particles. In one embodiment, fine size reduction can be performed at a temperature below the glass transition temperatures of both the polymer and the package material, if present, and at a temperature below the freezing point of the continuous phase of the latex.

In an alternative embodiment of the present invention, the above-described one or more consolidated polymer structures can be formed and reduced in size in a concurrent process. In this embodiment, the above-described latex containing emulsion polymer particles can be fed into a mill concurrently with a gas stream having a temperature above that of the latex (e.g., hot air). The temperature and velocity of the gas stream can be adjusted to obtain the desired residual moisture content in the resulting modified polymer particles. In one embodiment, at least about 70 weight percent, at least about 90 weight percent, or at least 95 weight percent of the continuous phase can be removed during the concurrent formation/reduction process.

Regardless of which of the above-described methods is employed, the resulting modified polymer particles can have a mean particle size in the range of from about 5 to about 800 micrometers, in the range of from about 10 to about 600 micrometers, or in the range of from 20 to 400 micrometers. Additionally, the modified polymer particles can have a particle size distribution where $D_{10}$ denotes the particle size for which 10 percent of the total sample volume is smaller and 90 percent is larger, $D_{50}$ denotes the particle size for which one-half of the sample volume is larger and one-half is smaller (i.e., median particle size), and $D_{90}$ is the particle size for which 90 percent of the total sample volume is smaller and 10 percent is larger. The modified polymer particles can have a $D_{10}$ particle size in the range of from about 0.5 to about 15 μm, in the range of from about 1 to about 12 μm, or in the range of from 2 to 10 μm. The modified polymer particles can have a $D_{50}$ particle size in the range of from about 10 to about 90 μm, in the range of from about 20 to about 80 μm, or in the range of from 30 to 70 μm. Additionally, the modified polymer particles can have a $D_{90}$ particle size in the range of from about 80 to about 170 μm, in the range of from about 90 to about 160 μm, or in the range of from 100 to 150 μm. As will be discussed in greater detail below, the resulting modified polymer particles can be dispersed in a carrier fluid for use as a drag reducer. In one embodiment, the resulting drag reducer can comprise modified polymer particles in the form of a suspension in a carrier fluid.

In one embodiment of the present invention, the modified polymer particles can be combined with a carrier fluid in order to form a drag reducer. As used herein, the term "drag reducer" shall denote a composition that when added to a fluid flowing through a conduit, is effective to reduce pressure loss associated with turbulent flow of the fluid through the conduit. The carrier fluid useful in the present invention can be any liquid that is a non-solvent for the modified polymer particles. For example, the carrier fluid can comprise water and/or lower carbon alcohols (e.g., methanol and/or ethanol). In one embodiment, the modified polymer particles and the carrier fluid can be added to a mixing tank and mixed in order to form a drag reducer. The amount of modified polymer particles added to the carrier fluid can be sufficient to form a drag reducer having at least about 5 weight percent polymer, in the range of from about 10 to about 40 weight percent polymer, or in the range of from 15 to 35 weight percent polymer.

In one embodiment, the carrier fluid can comprise other components to aid in the formation and/or maintenance of the drag reducer. These components can be added to the carrier fluid before, during, and/or after the modified particles are mixed with the carrier fluid. Such components include, but are not limited to, density balancing agents, freeze protection agents, suspension stabilizers, wetting agents, anti-foaming agents, and/or thickening agents.

Density balancing agents/freeze protection agents useful in the present invention include, but are not limited to, ethylene glycol and propylene glycol. The amount of density balancing agent/freeze protection agent employed in the present invention can be in the range of from about 10 to about 60 weight percent based on the weight of the carrier fluid.

Suspension stabilizers useful in the present invention include, but are not limited to talc, tri-calcium phosphate, magnesium stearate, silica, polyanhydride polymers, sterically hindered alkyl phenol antioxidants, and graphite. The amount of suspension stabilizer employed can be minimized or eliminated where possible to reduce the amount of material in the drag reducer that does not act as a drag-reducing agent. The amount of the suspension stabilizer added can be in the range of from about 0 to about 40 weight percent, in the range of from about 5 to about 25 weight percent, or in the range of from 8 to 12 weight percent based on the weight of the carrier fluid.

A wetting agent, such as a surfactant may be added to aid in the dispersal of the modified polymer particles. Non-ionic surfactants suitable for use as a wetting agent in the present invention include, but are not limited to, linear secondary alcohol ethoxylates, linear alcohol ethoxylates, and/or alkylphenol exthoxylates. Anionic surfactants suitable for use as a wetting agent in the present invention include, but are not limited to, alkyl benzene sulfonates and/or alcohol ethoxylate sulfates (e.g., sodium lauryl sulfate). The amount of wetting agent added can be in the range of from about 0.01 to about 1 weight percent, or in the range of from 0.01 to 0.1 weight percent, based on the weight of the carrier fluid.

In order to prevent foaming of the carrier fluid/modified polymer particle mixture during agitation, a suitable anti-foaming agent can be used. Examples of anti-foaming agents suitable for use in the present invention include, but are not limited to, ANTIFOAM products (available from Dow Corning, Midland, Mich.), and BUBBLE BREAKER products (available from Witco Chemical Company, Organics Division). The amount of anti-foaming agent employed can be less than about 1 weight percent, based on the weight of the carrier fluid.

After the carrier fluid/modified polymer particle mixture is formed, a thickening agent can be added to increase the viscosity of the mixture. Typical thickening agents are high molecular weight, water-soluble polymers. Thickening agents useful in the present invention include, but are not limited to, polysaccharides, xanthum gull, carboxymethyl cellulose, hydroxypropyl guar, and/or hydroxyethyl cellulose.

In another embodiment of the invention, the modified polymer particles can be added to the continuous phase of a latex already containing emulsion polymerized polymer particles in order to form a drag reducer. The latex of this embodiment can be prepared as described above. The modified polymer particles can be added to the latex in an amount sufficient to produce a drag reducer containing up to about 25 weight percent modified polymer particles based on the entire weight of the drag reducer. Additionally, the resulting drag reducer can comprise unmodified emulsion polymer particles (i.e., initial emulsion polymer particles) in the range of from about 10 to about 60 percent by weight of the drag reducer, or in the range of from 40 to 50 percent by weight of the drag reducer.

In one embodiment of the present invention, the above-described drag reducers can be added to a hydrocarbon-containing fluid. The resulting treated hydrocarbon-containing fluid can then be transported through a pipeline. The hydrocarbon-containing fluid can comprise a liquid phase hydrocarbon, a non-liquid phase hydrocarbon, and/or a non-hydrocarbon fluid. In one embodiment, the hydrocarbon-containing fluid can comprise at least about 50 weight percent of a liquid phase hydrocarbon. Additionally, the hydrocarbon-containing fluid can comprise crude oil.

The resulting treated hydrocarbon-containing fluid can comprise a cumulative amount of the drag reducing polymers sufficient to achieve a reduction in drag associated with the turbulent flow of the hydrocarbon-containing fluid through the pipeline of at least about 5 percent, at least about 10 percent, or at least 15 percent. In one embodiment, the treated hydrocarbon-containing fluid can have a cumulative concentration of drag reducing polymers in the range of from about 0.1 to about 500 parts per million by weight ("ppmw"), in the range of from about 0.5 to about 200 ppmw, in the range of from about 1 to about 100 ppmw, or in the range of from 2 to 50 ppmw. In one embodiment, at least about 50 weight percent, at least about 75 weight percent, or at least 95 weight percent of the polymer particles from the drag reducer can be dissolved by the hydrocarbon-containing fluid.

The following examples are intended to be illustrative of the present invention in order to teach one of ordinary skill in the art to make and use the invention and are not intended to limit the scope of the invention in any way.

EXAMPLES

Example 1

Preparation of Drag Reducer Polymers

Two batches (Batch 1 and Batch 2) of drag reducing polymers were prepared by emulsion polymerization employing the following procedure. Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 565.3 lbs of de-ionized water, 68.3 lbs of Polystep B-5 (surfactant, available from Stepan Company of Northfield, Ill.), 1.24 lbs of potassium phosphate monobasic (pH buffer), 0.97 lbs of potassium phosphate dibasic (pH buffer), and 33.2 grams of ammonium persulfate, $(NH_4)_2S_2O_8$ (oxidizer).

The monomer and water mixture was agitated at 110 rpm while being purged with nitrogen to remove any traces of oxygen in the reactor and was cooled to about 41° F. The two surfactants were added and the agitation was slowed down to 80 rpm for the remainder of the batch. The buffers and the oxidizer were then added. The polymerization reaction was initiated by adding into the reactor 4.02 grams of ammonium iron(II) sulfate, $Fe(NH_4)_2(SO_4)_2 \cdot 6H_2O$ in a solution of 0.010 M sulfuric acid solution in DI water at a concentration of 1,117 ppm at a rate of 5 g/min. The solution was injected for 10 hours to complete the polymerization. The resulting latex was pressured out of the reactor through a 5-micron bag filter and stored.

The resulting drag reducer was a latex containing poly(2-ethylhexyl methacrylate) as the active ingredient. The sample had a solids content of 41.2 percent by mass and a nominal polymer content of 40 percent. The density of the sample was 1.0005 g/mL. The continuous phase was 100% water.

Example 2

Polymer Consolidation and Reduction

The latexes of Batch 1 and Batch 2, as prepared in Example 1, each underwent the following procedure for increasing the particle size of their respective polymer particles. The polymer particles of the latex were agglomerated using a thin-layer drying technique. For this procedure, the latex was spread in a thin layer on sheet pans. Employing a fan, room temperature air was blown across the pans overnight to evaporate the continuous phase from the latex. After drying, the resulting agglomerated polymer was manually broken apart with a metal hammer into pieces of agglomerated polymer of suitable size to be cryoground.

After the agglomerated polymers were manually reduced in size, each batch was subjected to cryogrinding in a hammermill using the following procedure. 850 grams of each batch were combined with 365 grams of calcium stearate partitioning agent in separate plastic containers and shaken to mix. The containers and their contents were pre-chilled by placing them in dry-ice prior to cryogrinding. Each mixture was then individually placed into dewar flasks and frozen with liquid nitrogen. The mixtures were then separately ground by slowly feeding each mixture to a hammermill over a period of approximately 10 minutes. During grinding, the temperature of the hammermill was kept below the glass transition temperature of the polymer using liquid nitrogen. The resulting tw-o batches of cryoground drag reducing polymers (i.e., modified polymer particles) were then divided into three sub-batches each: 1A, 1B, 1C; and 2A, 2B, 2C.

Example 3

Suspension Preparation

Each of the 6 sub-batches prepared in Example 2 was separately suspended in an aqueous carrier fluid according to the following procedure. The cryoground polymer was first sieved in order to eliminate undesired lumps. Next, 434.98 g of de-ionized water, 11.48 g of TERGITOL 15-S-7 (surfactant, available from Dow Corning Corp., Midland, Mich.), and 3.82 g of ANTIFOAM 1410 (available from Dow Corning Corp., Midland, Mich.) were mixed into a 1 L plastic container. The mixture was then stirred at 600 rpm for 2 minutes. 230.02 g of the cryoground polymer was added slowly over a period of approximately 3 to 4 minutes while continually stirring the mixture at 600 rpm. Once all of the cryoground polymer was added, the mixture was stirred at 600 rpm for an additional 10 minutes. Next, 19.74 g of AQU D-3334 HEC (hydroxyethylcellulose, manufactured by Aqualon Company) was injected into the suspension using a 50 mL syringe. The suspension was then stirred at a speed of 1200 rpm for 10 minutes.

Example 4

Particle Size Analyses

The particle sizes of the cryoground polymer in the suspensions prepared in Example 3 were analyzed employing a BECKMAN COULTER LS Particle Size Analyzer, model LS 230, Small Volume Module. Table 1 below displays the results from the analyses, including the mean particle size. Additionally, particle size distributions are given for each sub-batch, where $D_{10}$ denotes the particle size for which 10 percent of the total sample volume is smaller and 90 percent is larger, $D_{50}$ denotes the particle size for which one-half of the sample volume is larger and one-half is smaller (i.e., median particle size), and $D_{90}$ is the particle size for which 90 percent of the total sample volume is smaller and 10 percent is larger.

TABLE 1

Results of Particle Size Analyses

| Sub-Batch | Mean Particle Size (µm) | $D_{10}$ (µm) | $D_{50}$ (µm) | $D_{90}$ (µm) |
|---|---|---|---|---|
| 1A | 72.31 | 8.03 | 58.97 | 140.80 |
| 1B | 70.74 | 6.23 | 54.18 | 142.80 |
| 1C | 68.84 | 7.23 | 55.44 | 137.80 |
| 2A | 68.04 | 8.26 | 56.01 | 141.50 |
| 2B | 53.41 | 4.87 | 42.30 | 112.10 |
| 2C | 50.88 | 4.58 | 40.68 | 110.10 |

Typically, emulsion polymers in latex form will have a mean particle size of less than about 1 micrometer. As can be seen by looking at the results in Table 1, the mean particle size of each of the emulsion polymers after consolidation and size reduction performed in Example 2 is greater than the mean particle size of typical emulsion polymers in latex form.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "consolidated polymer structure" refers to polymer particles or structures having an increased average particle size compared to the average particle size of the polymer particles prior to consolidation.

As used herein, the terms "containing," "contains," and "contain" have the same open-ended meaning as "comprising," "comprises," and "comprise" provided above.

As used herein, the term "cryogrinding" shall denote any process whereby a polymer is reduced to a finely divided state at cryogenic temperatures.

As used herein, the term "cryogenic temperature" shall denote any temperature below the glass transition temperature of a particular polymer.

As used herein, the term "drag reducer" refers to a composition that, when added to a fluid flowing through a conduit, is effective to reduce pressure loss associated with turbulent flow of the fluid through the conduit.

As used herein, the term "emulsion polymer" shall denote any polymer prepared via emulsion polymerization.

As used herein, the term "finely divided state" when used to describe a particulate material shall denote an average particle size of less than 2,000 μm.

As used herein, the term "flashing" denotes a process whereby at least a portion of a solution is vaporized by sudden decrease in pressure and/or increase in temperature.

As used herein, the term "freeze/thaw stability" denotes the degree to which the polymer portion of a latex can resist coagulation or flocculation when frozen as determined by ASTM method D2243.

As used herein, the terms "having," "has," and "have" have the same open-ended meaning as "comprising," "comprises," and "comprise" provided above.

As used herein, the term "HLB number" refers to the hydrophile-lipophile balance of an amphiphilic compound as determined by the methods described by W. C. Griffin in *J. Soc. Cosmet. Chem.*, 1, 311 (1949) and *J. Soc. Cosmet. Chem.*, 5, 249 (1954).

As used herein, the term "high HLB" shall denote an HLB number of 7 or more.

As used herein, the terms "including," "includes," and "include" have the same open-ended meaning as "comprising," "comprises," and "comprise" provided above.

As used herein, the term "polymer" refers to homopolymers, copolymers, terpolymers of one or more chemical species.

As used herein, the term "turbulent flow" refers to fluid flow having a Reynolds number of at least 2,000.

As used herein, the term "weight average molecular weight" refers to the molecular weight of a polymer calculated according to the following formula: $\Sigma_i(N_iM_i^2)/\Sigma_i(N_iM_i)$, where $N_i$ is the number of molecules of molecular weight $M_i$.

Claims not Limited to the Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for preparing a drag reducer, said process comprising:
   (a) consolidating a plurality of initial particles comprising at least one polymer prepared via emulsion polymerization to thereby form one or more consolidated polymer structures;
   (b) decreasing the size of at least a portion of said consolidated polymer structures to thereby form a plurality of modified polymer particles; and
   (c) dispersing at least a portion of said modified polymer particles in a carrier fluid to thereby form said drag reducer.

2. The process of claim 1, wherein said initial particles have an average particle size of less than 1 micrometer.

3. The process of claim 1, wherein said modified polymer particles have an average particle size in the range of from about 5 to about 800 micrometers.

4. The process of claim 1, wherein said consolidated polymer structures have an average particle size at least 5 times greater than the particle size of said initial particles.

5. The process of claim 1, wherein said polymer has a weight average molecular weight of at least $1\times10^6$ g/mol.

6. The process of claim 1, wherein said polymer comprises a non-polyalphaolefin polymer.

7. The process of claim 1, wherein said polymer comprises the residues of one or more monomers selected from the group consisting of:

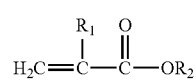

(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—R$_A$ or —(CH2CH(CH3)O)$_x$—R$_A$ radical wherein x is in the range of from 1 to 50 and R$_A$ is H, a C1-C30 alkyl radical, or a C6-C30 alkylaryl radical;

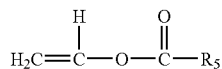  (B)

wherein arene is a phenyl, naphthyl, anthracenyl, or phenanthrenyl, R$_3$ is CH=CH$_2$ or CH$_3$—C=CH$_2$, and R$_4$ is H, a C1-C30 alkyl radical, a C5-C30 substituted or unsubstituted cycloalkyl radical, Cl, SO$_3$, OR$_B$, or COOR$_C$, wherein R$_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein R$_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

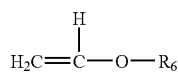  (C)

wherein R$_5$ is H, a C1-C30 alkyl radical, or a C6-C20 substituted or unsubstituted aryl radical;

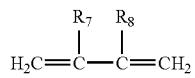  (D)

wherein R$_6$ is H, a C1-C30 alkyl radical, or a C6-C20 substituted or unsubstituted aryl radical;

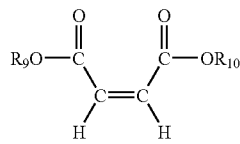  (E)

wherein R$_7$ is H or a C1-C18 alkyl radical, and R$_8$ is H, a C1-C18 alkyl radical, or Cl;

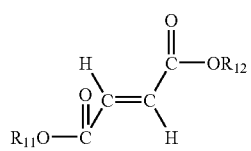  (F)

wherein R$_9$ and R$_{10}$ are independently H, a C1-C30 alkyl radical, a C6-C20 substituted or unsubstituted aryl radical, a C5-C30 substituted or unsubstituted cycloalkyl radical, or heterocyclic radicals;

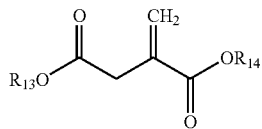  (G)

wherein R$_{11}$ and R$_{12}$ are independently H, a C1-C30 alkyl radical, a C6-C20 substituted or unsubstituted aryl radical, a C5-C30 substituted or unsubstituted cycloalkyl radical, or heterocyclic radicals;

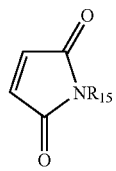  (H)

wherein R$_{13}$ and R$_{14}$ are independently H, a C1-C30 alkyl radical, a C6-C20 substituted or unsubstituted aryl radical, a C5-C30 substituted or unsubstituted cycloalkyl radical, or heterocyclic radicals;

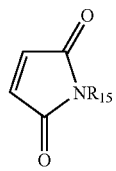  (I)

wherein R$_{15}$ is H, a C1-C30 alkyl radical, a C6-C20 substituted or unsubstituted aryl radical, a C5-C30 substituted or unsubstituted cycloalkyl radical, or heterocyclic radicals;

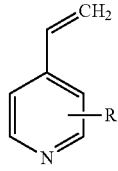  (J)

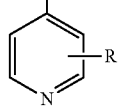  (K)

wherein R$_{16}$ is H, a C1-C30 alkyl radical, or a C6-C20 aryl radical;

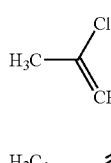  (L)

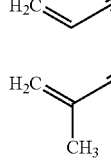  (M)

(N)

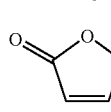  (O)

-continued

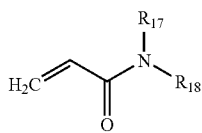
(P)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and

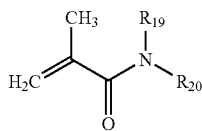
(Q)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

8. The process of claim 1, wherein said polymer comprises repeating units of the residues of C4-C20 alkyl, C6-C20 substituted or unsubstituted aryl, or aryl-substituted C1-C10 alkyl ester derivatives of methacrylic acid or acrylic acid monomers.

9. The process of claim 1, wherein said polymer comprises repeating units of the residues of 2-ethylhexyl methacrylate monomers.

10. The process of claim 1, wherein said consolidating of step (a) comprises drying, freezing, combining an agglomeration agent with, and/or dissolving and precipitating at least a portion of said initial particles.

11. The process of claim 1, wherein said initial particles are in the form of a latex further comprising a continuous phase prior to said consolidating of step (a).

12. The process of claim 11, wherein said consolidating of step (a) comprises drying said latex to remove at least a portion of said continuous phase.

13. The process of claim 12, wherein said drying removes at least 70 weight percent of said continuous phase.

14. The process of claim 12, wherein said drying comprises spray drying, thin-layer drying, and/or freeze drying.

15. The process of claim 11, wherein said consolidating of step (a) comprises combining an agglomeration agent with said latex, wherein said agglomeration agent causes at least a portion of said initial particles to at least partially agglomerate thereby forming said one or more consolidated polymer structures.

16. The process of claim 15, wherein said agglomeration agent comprises salt water, wherein the salt in said salt water comprises any compound capable of being ionized in water.

17. The process of claim 15, wherein said agglomeration agent comprises a $C_1$ to $C_4$ alcohol, dimethyl formamide, dimethyl acetamide, tetrahydrofuran, sulfolane, nitromethane, furfural, and/or 1-methyl-2-pyrrolidinone.

18. The process of claim 15, further comprising removing at least 70 weight percent of said continuous phase from said one or more consolidated polymer structures after agglomeration.

19. The process of claim 11, wherein said consolidating of step (a) comprises freezing said latex.

20. The process of claim 1, wherein said consolidating of step (a) comprises dissolving at least a portion of said initial particles in a solvent to form a solution and thereafter precipitating said polymer out of said solution to thereby form said one or more consolidated polymer structures.

21. The process of claim 1, wherein said decreasing of step (b) comprises course reduction of said consolidated polymer structures to thereby form intermediate polymer particles having an average size of less than about 2.5 inches on each side, wherein said decreasing of step (b) further comprises fine reduction of said intermediate polymer particles to thereby form said modified polymer particles.

22. The process of claim 1, wherein said decreasing of step (b) is performed at a temperature below the glass transition temperature ($T_g$) of said polymer.

23. The process of claim 1, wherein said consolidated polymer structures are dispersed within a continuous phase, wherein said decreasing of step (b) is performed at a temperature below the freezing point of said continuous phase.

24. The process of claim 1, wherein said carrier fluid comprises water and/or alcohol.

25. The process of claim 1, wherein said carrier fluid is in the form of a latex further comprising a plurality of second drag reducing polymer particles having an average particle size of less than about 1 micrometer.

\* \* \* \* \*